United States Patent
Candelore et al.

(10) Patent No.: US 11,503,361 B1
(45) Date of Patent: Nov. 15, 2022

(54) USING SIGNING FOR INPUT TO SEARCH FIELDS

(71) Applicant: Sony Group Corporation, Tokyo (JP)

(72) Inventors: Brant Candelore, Poway, CA (US); Adam Michael Goldberg, Fairfax, VA (US); Robert N. Blanchard, Escondido, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/385,798

(22) Filed: Jul. 26, 2021

(51) Int. Cl.
*H04N 21/4223* (2011.01)
*H04N 21/482* (2011.01)

(52) U.S. Cl.
CPC ..... *H04N 21/4223* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 10,685,219 B2 | 6/2020 | Kim et al. | |
| 10,783,192 B1* | 9/2020 | Soubbotin | G06F 16/2428 |
| 2006/0026641 A1* | 2/2006 | Jule | H04N 21/42204 |
| | | | 348/E5.103 |
| 2009/0315740 A1* | 12/2009 | Hildreth | G06F 3/017 |
| | | | 341/20 |
| 2011/0026765 A1* | 2/2011 | Ivanich | G06V 40/28 |
| | | | 382/103 |
| 2011/0301934 A1* | 12/2011 | Tardif | G06F 40/44 |
| | | | 382/103 |
| 2012/0069168 A1* | 3/2012 | Huang | G06F 3/017 |
| | | | 345/158 |
| 2012/0249768 A1* | 10/2012 | Binder | H04N 21/4223 |
| | | | 348/E7.085 |
| 2013/0006957 A1* | 1/2013 | Huang | G06F 3/04883 |
| | | | 707/706 |
| 2013/0076990 A1* | 3/2013 | Kim | H04N 21/4782 |
| | | | 348/734 |
| 2013/0179783 A1* | 7/2013 | Woods | H04N 21/4222 |
| | | | 715/716 |
| 2014/0046922 A1* | 2/2014 | Crook | G06F 16/3326 |
| | | | 707/706 |
| 2015/0106399 A1* | 4/2015 | Hinckley | G06F 3/0488 |
| | | | 707/769 |

(Continued)

FOREIGN PATENT DOCUMENTS

CN 110807388 B 6/2021
JP 3346799 B2 11/2002

OTHER PUBLICATIONS

"Spider in Sign Language, ASL Dictionary for kids", YouTube, Dec. 14, 2015, retrieved from https://www.youtube.com/watch?v=hds0QJINQNY.

(Continued)

*Primary Examiner* — Alexander Q Huerta
(74) *Attorney, Agent, or Firm* — John L. Rogitz

(57) ABSTRACT

A display device such as a TV has an image capture device to image gestures of a hearing-impaired user. The display device operates in a navigation mode, in which non-sign gestures can be made by the user to navigate a user interface, and a sign mode, in which sign language gestures may be made by the user to enter search terms to search for content.

16 Claims, 5 Drawing Sheets

(56) References Cited

U.S. PATENT DOCUMENTS

2016/0307469 A1\* 10/2016 Zhou ................... G09B 21/009
2017/0330484 A1\* 11/2017 Shovkoplias .... H04N 21/42222

OTHER PUBLICATIONS

Khan et al., "A Sign Language to Text Converter Using Leap Motion", Dec. 2016, School of Information Technology, UCSI University, Kuala Lumpur, Malaysia, University Malaysia of Computer Science & Engineering, Malaysia.
Saqib et al., "Automatic Sign Language Recognition: Performance Comparison of Word based Approach with Spelling based Approach", (IJACSA) International Journal of Advanced Computer Science and Applications, vol. 9, No. 5, 2018.

\* cited by examiner

USING SIGNING FOR INPUT TO SEARCH FIELDS

FIELD

The present application relates generally to using signing for input to search fields.

BACKGROUND

As understood herein, people who are significantly hearing-impaired may not be able to speak in a manner that can be understood by natural language conversion software such as may be employed in voice recognition or voice assistant technology for purposes such as, for instance, inputting search terms for content to a display device such as a TV. While attempts have been made to train natural language conversion software to understand speech with impediments in it, the loss of feedback to the speaker may be too large to be compensated for.

As also understood herein, providing a navigation-only gesture interface in which a hearing impaired person can navigate a cursor up/down/left/right to select letters is cumbersome and time-consuming. It is not nearly as convenient as being able to input search terms in a manner paralleling natural speech input, as is afforded to people with unimpeded speech via speech recognition technology.

SUMMARY

Accordingly, a system includes at least one computer medium that is not a transitory signal and that in turn instructions executable by at least one processor to receive at least one image from at least one image capture device of a person making at least one sign language gesture. The instructions are executable to identify at least one letter or word indicated by the gesture, input the letter or word to a search engine associated with a display device to search for content for presentation thereof on the display device based on the at least one letter or word, and present on the display device results of a search for content based on the at least one letter or word. The instructions are executable to present on the display device content selected from the results of the search.

In some embodiments the instructions can be executable to present on the display device at least one user interface (UI) prompting to input only letters using sign language. The instructions may be executable to process as a search query only letters indicated by sign language gestures and not process as a search query at least a first word represented by a first sign language gesture.

In example implementations the instructions can be executable to configure the display device in a navigation mode, in which images of non-sign language gestures are used to provide navigation of at least one user interface (UI) on the display device, and to configure the display device in a text input mode, in which images of sign language gestures are used to input search terms for content.

Example embodiments may include instructions that are executable to ignore sign language gestures in the navigation mode, and to exit the navigation mode and enter the text input mode responsive to selection of a search term input function on at least one user interface (UI). Selection of the search term input function may include locating a cursor in a search term entry box and/or selecting the entry box.

In another aspect, an apparatus includes at least one computer medium that is not a transitory signal and that in turn instructions executable by at least one processor to configure a display device in a navigation mode, in which images of non-sign language gestures are used to provide navigation of at least one user interface (UI) on the display device. The instructions also are executable to configure the display device in a text input mode, in which images of sign language gestures are used to input search terms for content.

In another aspect, a method includes receiving images of a person making sign language gestures, and identifying language elements such as letters or whole words from the sign language gestures. The method includes inputting the language elements as search information to a search engine. Further, the method includes receiving results of a search for content from the search engine based on the language elements and presenting the results on at least one display device.

The details of the present application, both as to its structure and operation, can be best understood in reference to the accompanying drawings, in which like reference numerals refer to like parts, and in which:

DETAILED DESCRIPTION

Figure 1:
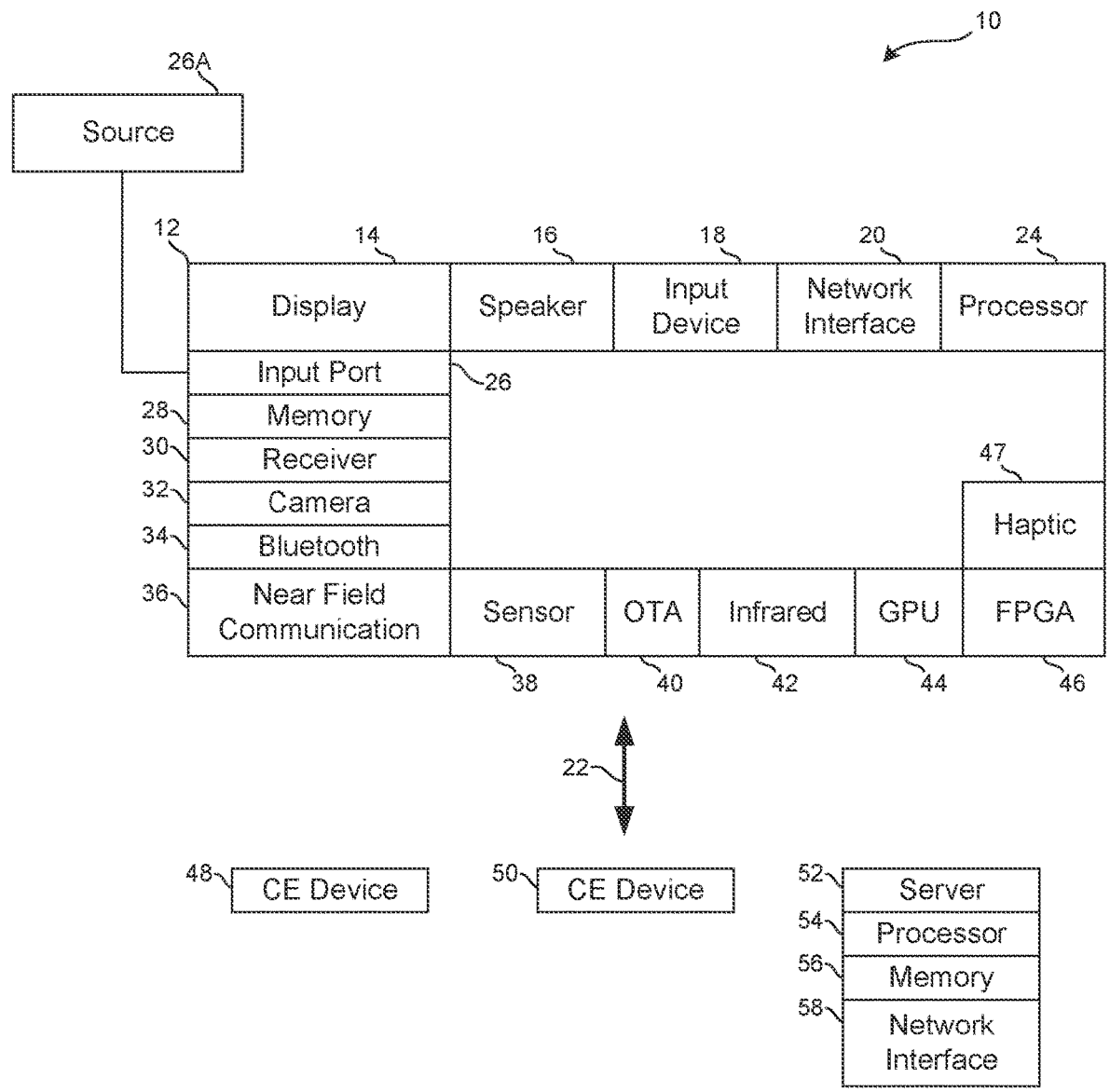
FIG. 1 is a block diagram of an example system including an example in accordance with present principles.

This disclosure relates generally to computer ecosystems including aspects of consumer electronics (CE) device networks such as but not limited to home entertainment networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more image capture devices 32 that may be a thermal imaging image capture device, a digital image capture device such as a webcam, an event-based sensor, and/or an image capture device integrated into the AVD 12 and controllable by the processor 24 to gather pictures/images and/or video in accordance with present principles. The image capture device 32 may be built-in, or may connected to the processor of the AVDD by, e.g., universal serial bus (USB,) or may be separate from the AVDD and networked thereto, e.g., via web connectivity.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, nested into multiple UIs with the functionalities described herein, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
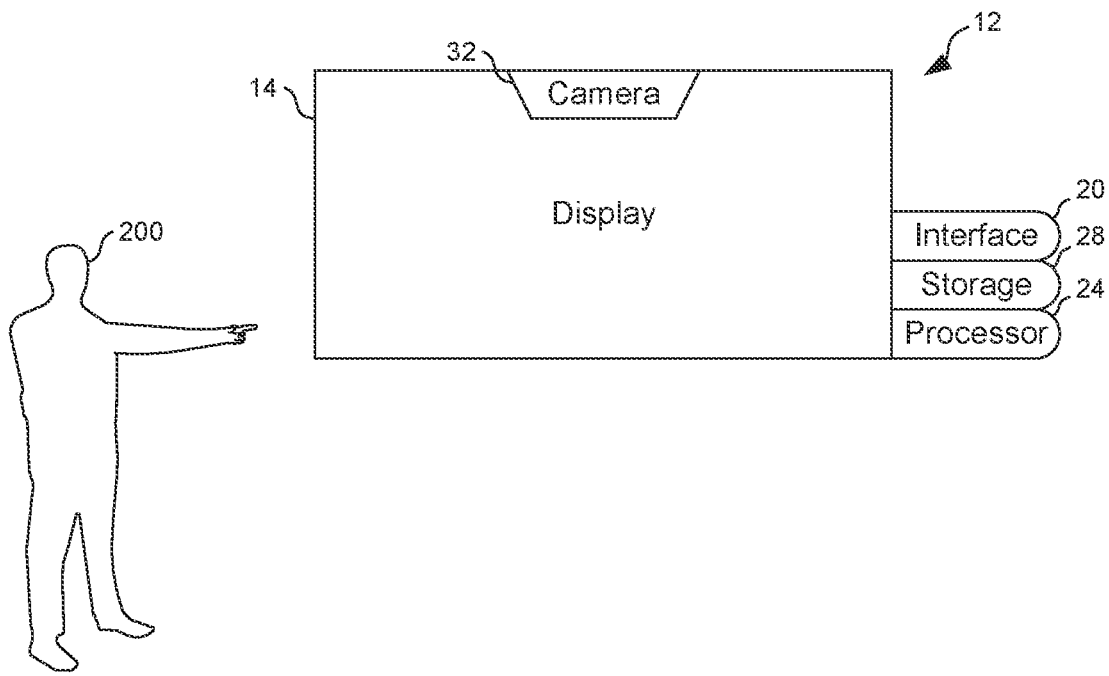
FIG. 2 illustrates an example system employing the display device shown in FIG. 1, embodied as a TV.

FIG. 2 illustrates a user 200 gesturing in free space in front of a display device such as the AVD 12. The user's gestures are imaged by an image capture device such as the image capture device 32 shown in FIG. 1, which provides images of the gestures to a remote or local processor such as the AVD processor 24 accessing instructions such as may be stored on the memory 28 to execute logic herein, it being understood that in addition or alternatively the images can be provided via the network interface 20 to a remote processor such as the server processor 54 shown in FIG. 1 for processing and configuring the display 14 according to disclosure below.

Figure 3:
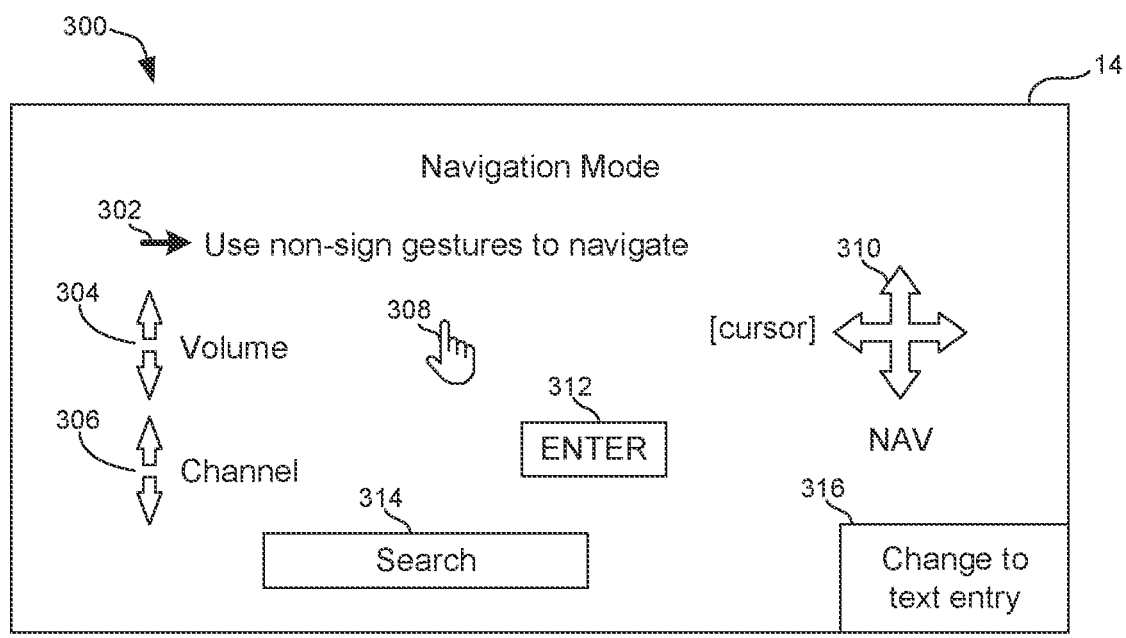
FIG. 3 illustrates an example navigation mode user interface (UI) consistent with present principles.

FIG. 3 illustrates a UI 300 that may be presented on any display herein such as the AVD display 14 when the AVD 12 is in a navigation mode. The UI 300 is an example navigation mode UI, in which gestures in free space that are not sign language gestures but rather navigation gestures such as may mimic swipes, finger squeezes, etc. against a touch sensitive display are made by the user to navigate the UI 300. To this end, a prompt 302 may be presented to alert the user that the UI 300 is a navigation UI and that non-sign language gestures should be used to navigate the UI, with gestures representing alpha-numeric characters and/or words and indeed phrases of multiple words in some instances being ignored by the processor if desired, in non-limiting embodiments.

The navigation mode UI 300 may include, for example, volume up/down selectors 304 and channel up/down selectors 306 that a user can select to change volume and channel by, e.g., executing a grab gesture in free space to grab a cursor 308 and move the cursor 308 over the desired selector. An up or down gesture may be made to raise and lower volume or channel. The cursor 308 may be moved by grabbing it using, for example, a clenched fist gesture and then moving the fist in space until the cursor is over the desired selector, or by moving the cursor 308 over a four-way navigation cruciform 310 and then moving the hand in free space up, down, left, and right as desired for moving the cursor in the same directions on the display. An "enter" selector 312 may be selected to enter a command, it now being understood that more or fewer than the non-limiting example selectors shown in FIG. 3 may be employed by the navigation UI 300.

The navigation UI 300 shown in FIG. 3 also may include a search bar or field 314. The user may hover the cursor over the search bar or field 314 using gestures in free space or otherwise select the search bar or field 314 to select to input search terms for context into the search bar or field 314. In some examples, once the search bar or field is selected using non-sign language gestures, the mode of the AVD may automatically switch from navigation mode to text entry mode in which free space gestures are interpreted to represent natural language alpha-numeric characters and/or words and/or phrases. For example, the gestures may be interpreted to be American sign language gestures in the text entry mode. In some examples, the user may select to exit the navigation mode and enter the text entry mode using a change mode selector 316.

Figure 4:
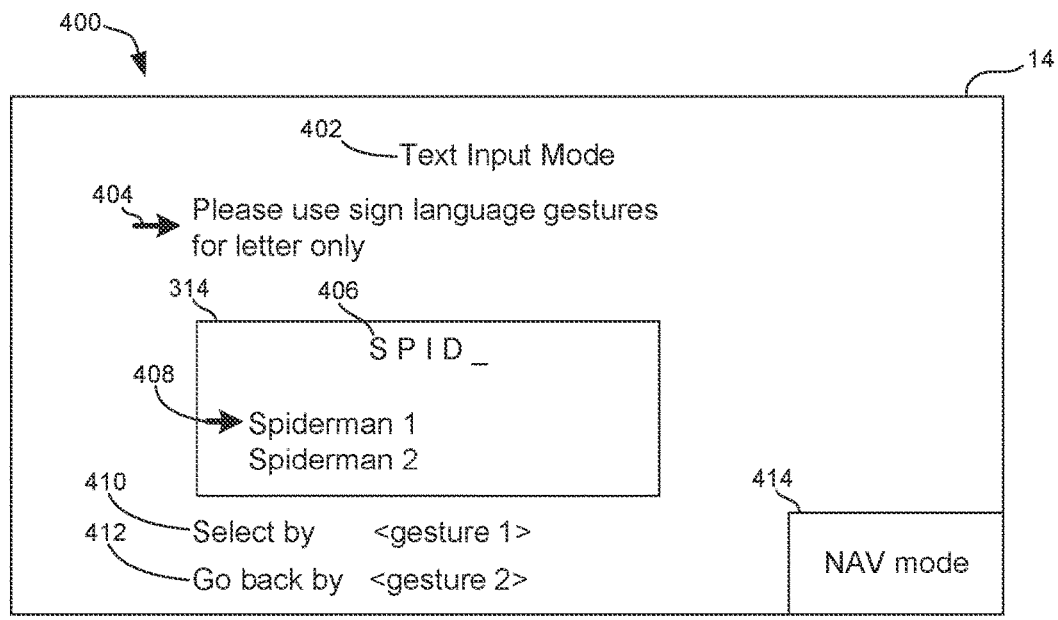
FIG. 4 illustrates an example text entry (search) UI consistent with present principles.

FIG. 4 illustrates a UI 400 that may be presented on any display discussed herein such as the AVD display 14. The UI 400 may indicate at 402 that the text entry (or input) mode is active. The UI 400 may also include a prompt 404 to use sign language gestures to enter text into the search bar or field 314. In the example shown, the prompt 404 indicates to enter alpha-numeric characters only, and not to use gestures representing whole words, which whole word gestures if imaged by the image capture device may in some embodiments be ignored. This is for simplification. In other embodiments, whole word gestures may be permitted and considered.

In the example shown, the user has made sign language gestures in free space representing at 406 the letters "S", "P", "I", and "D". A pre-search may be executed as each letter is entered using sign language gestures in free space to narrow down a list 408 of search results, in this case, the movies "Spiderman 1" and "Spiderman 2". Although not described in further, the user did not have to select "text input mode", and then gestures could be interpreted as entire words. For example, the gesture word for "spider" are two hands crossed over with fingers making crawling signs. And the gesture for "man" is an open palm with fingers spread from the top from of the face to the middle of the chest. The search result would be the same movies, "Spiderman 1" and Spiderman 2".

The user may select an entry on the list 408 using a gesture indicated at 410. For example, to select the first entry, the user may be prompted to hold up one finger, and to hold up two fingers to select the second entry. Or, the user may be prompted to sign the gesture for "first" to select the first entry and to sign the gesture "second" for the second entry. These are but two examples of ways for a user to select an entry from the list 408.

The user may also be prompted at 412 to make a certain gesture in free space to go back either to the navigation mode or to a clear text entry field 314 in the text entry mode. For example, the user may be prompted to make a circle with the hand to go back, or to sign "go back" using sign language gestures in free space. In addition or alternatively, the user may select a navigation mode selector 414 to return to the navigation mode.

Figure 5:
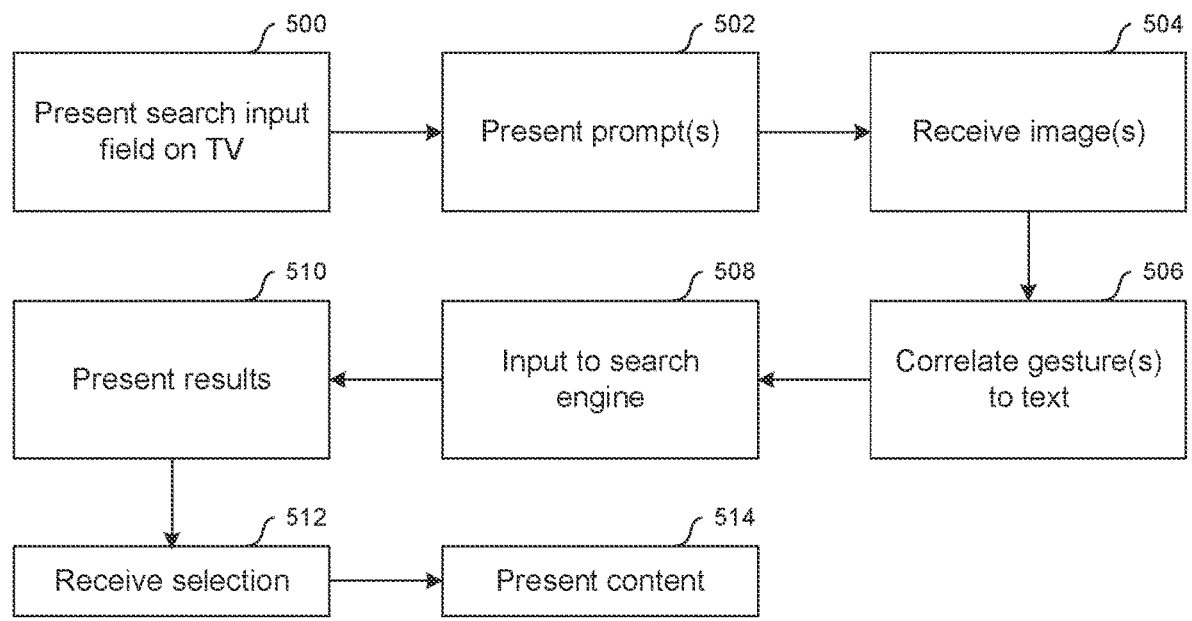
FIG. 5 illustrates example search logic in example flow chart format consistent with present principles.

FIG. 5 illustrates further with example logic. Commencing at block 500, a search input bar or field is presented on the display. Any desired prompts such as the example prompts discussed above are presented at block 502. Images from the image capture device of the user making gestures in free space are received at block 504 and correlated to text at block 506 using image recognition techniques, one example of which is described further below in the context of machine learning (ML).

Proceeding to block 508, text derived from free space sign language gestures such as gestures representing natural language letters is input to search engine. The search engine may search available content. The search engine may be a search engine associated with a broadcast TV source, or with a video service source, or with an Internet source or sources of content, or combinations thereof.

Results of the search are received and presented at block 510. Should the user select a result the selection is received at block 512 and the underlying content accessed and presented on the display device (such as the AVD 12 shown in FIG. 1) at block 514.

Figure 6:
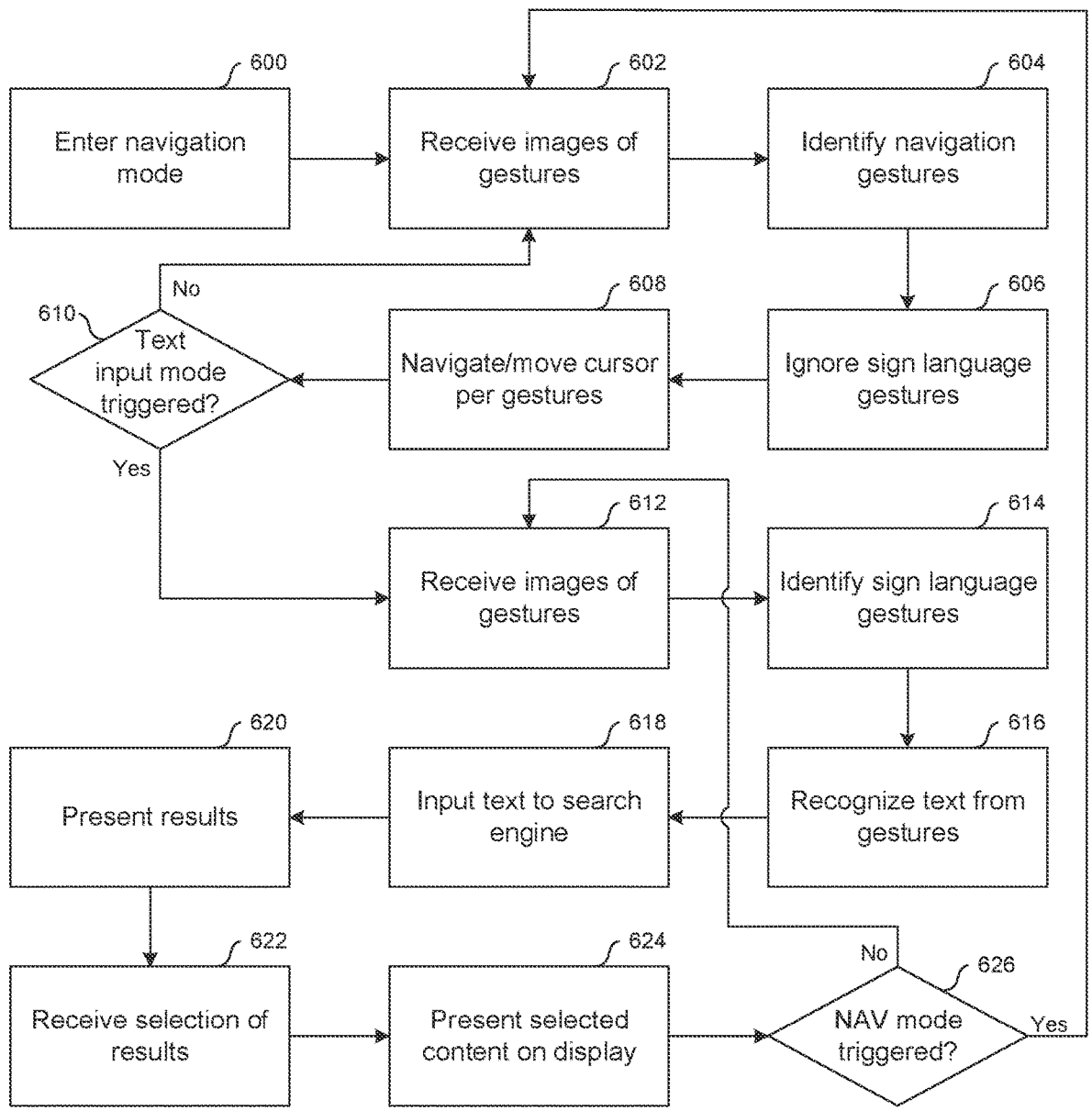
FIG. 6 illustrates additional detailed example logic in example flow chart format consistent with present principles.

Recall that some embodiments may employ a display device that in relevant part has a navigation mode and a text entry mode. FIG. 6 illustrates example logic that may be used in such an implementation.

Commencing at block 600, the navigation mode is entered. A navigation mode UI such as the UI 300 shown in FIG. 3 may be presented. Moving to block 302, images of free space gestures (in the example of FIG. 3, non-sign language gestures) are received from the image capture device at block 602.

Proceeding to block 604, navigation gestures are identified from the images using image recognition techniques. If desired, block 606 indicates that in the navigation mode, sign language gestures may be ignored. Navigation is effected at block 608 in accordance with the navigation gestures received at block 602 to navigate around the navigation mode UI.

Decision diamond 610 represents a possible switch from navigation mode to txt entry mode in the event that a text input mode trigger is received. Two non-limiting examples of such a trigger are described above. If the text entry mode is triggered, the logic proceeds to block 612 to once again receive images of the user gesturing in free space, with sign language gestures being identified at block 614. At block 616 text is recognized from the gestures in the images using mage recognition techniques to correlate sign language gestures to the text they represent. The text is input at block 618 to a search engine, and received results of the search from the search engine are presented at block 602.

Moving to block 622, any user selections from the results are received. The content selected as a result of selecting a search result associated with content is presented at block 624. Decision diamond 626 simply indicates that as described above, a user can elect to reenter the navigation mode, in which case the logic loops back to block 602. Otherwise, the logic continues at block 612.

Figure 7:
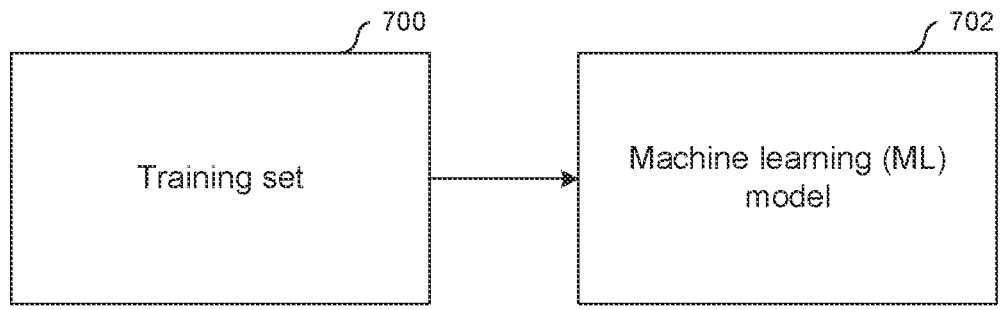
FIG. 7 illustrates an example machine learning (ML) model receiving a training s of data.
Figure 8:
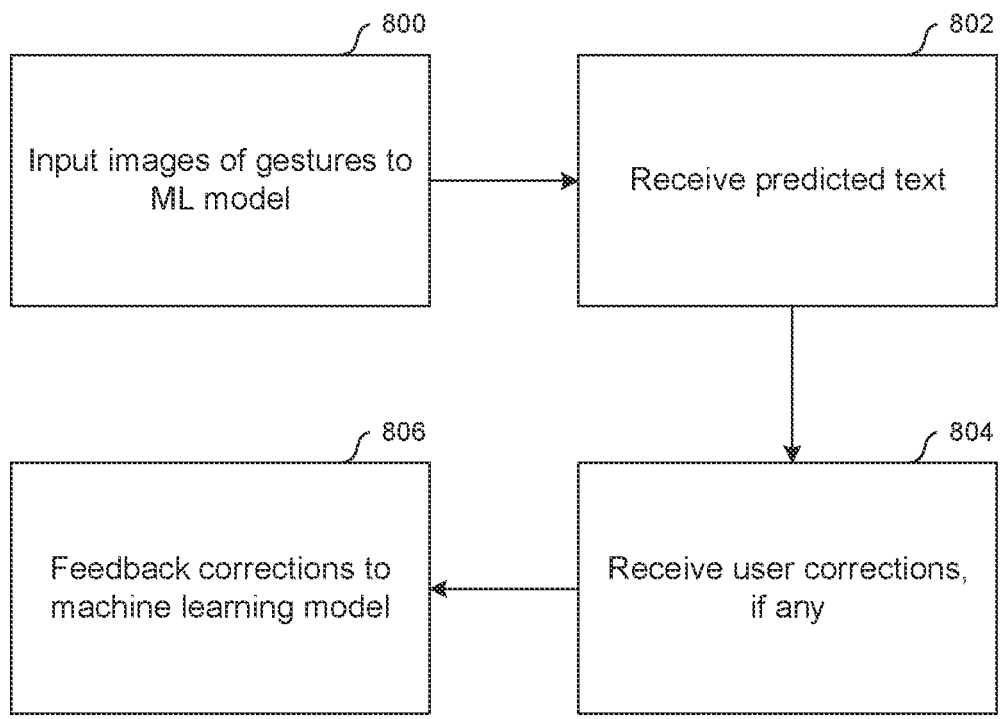
FIG. 8 illustrates example ML model in example flow chart format consistent with present principles.

Both non-sign language navigation gestures and sign language gestures may be correlated to their respective navigation functions/text as the case may be using machine learning. FIGS. 7 and 8 illustrate an example.

In FIG. 7, a training set of data 700 is input to a ML model 702. The training set includes sequences of images (or videos) of gestures in free space along with their ground truth meaning. For example, a swipe left in free space may be associated with a ground truth meaning of "move cursor left" whereas a sign language gesture representing the letter "A" may be associated with a ground truth text meaning of "A". Likewise, in embodiments that permit sign language entry of whole words using a single sign language gesture, images of such gestures may be input along with the ground truth textual words they represent as part of the training set.

Once trained, the ML model 702 may operate in accordance with example FIG. 8. Commencing at block 800, images of gestures in free space are input to the ML model 702. Assuming the text entry mode, the ML model 702 returns predicted text (in the case of sign language gestures) at block 802, it being understood that the ML model similarly may be used to return navigation commands in the case of non-sign language navigation gestures in the navigation mode. The text is received from the ML model and input to the search engine as described.

Any user corrections may be received at block 804 and fed back at block 806 to the ML model to refine the learning of the model. For example, should a user select "go back" at 412 in FIG. 4 to clear the text entry bar or filed, this may be fed back to the ML model to indicate to the ML model a possible mistaken prediction.

While the particular embodiments are herein shown and described in detail, it is to be understood that the subject matter which is encompassed by the present invention is limited only by the claims.

What is claimed is:

1. An apparatus comprising:
    at least one computer storage comprising instructions executable by at least one processor to:
    receive at least one image from at least one image capture device of a person making at least one sign language gesture;
    identify at least one letter or word indicated by the gesture;
    input the letter or word to a search engine associated with a display device to search for content for presentation thereof on the display device based on the at least one letter or word;
    present on the display device results of a search for content based on the at least one letter or word;
    present on the display device content selected from the results of the search;
    configure the display device in a navigation mode, in which images of non-sign language gestures are used to provide navigation of at least one user interface (UI) on the display device;
    configure the display device in a text input mode, in which images of sign language gestures are used to input search terms for content; and
    ignore sign language gestures in the navigation mode and ignore non-sign language gestures in the text input mode.

2. The apparatus of claim 1, wherein the instructions are executable to:
    present on the display device at least one user interface (UI) prompting to input only letters using sign language.

3. The apparatus of claim 1, wherein the instructions are executable to:
    process as a search query only letters indicated by sign language gestures and not process as a search query at least a first word represented by a first sign language gesture.

4. The apparatus of claim 1, wherein the gesture indicates at least one word image capture device.

5. The apparatus of claim 1, wherein the instructions are executable to:
    exit the navigation mode and enter the text input mode responsive to selection of a search term input function on at least one user interface (UI).

6. The apparatus of claim 5, wherein selection of the search term input function comprises locating a cursor in a search term entry box.

7. An apparatus comprising:
    at least one computer storage comprising instructions executable by at least one processor to:
    configure a display device in a navigation mode, in which images of non-sign language gestures are used to provide navigation of at least one user interface (UI) on the display device; and
    configure the display device in a text input mode, in which images of sign language gestures are used to input search terms for content, wherein sign language gestures do not result in input of search terms for content in the navigation mode.

8. The apparatus of claim 7, comprising the at least one image capture device configured to input images to the at least the one processor, the at least one processor, and the at least one display device.

9. The apparatus of claim 7, wherein the instructions are executable to:
    exit the navigation mode and enter the text input mode responsive to selection of a search term input function on at least one user interface (UI).

10. The apparatus of claim 9, wherein selection of the search term input function comprises locating a cursor in a search term entry box.

11. The apparatus of claim 7, wherein the display device comprises a television.

12. The apparatus of claim 7, wherein the instructions are executable to:
    present on the display device at least one user interface (UI) prompting to input only letters using sign language.

13. The apparatus of claim 7, wherein the instructions are executable to:
    process as a search query only letters indicated by sign language gestures and not process as a search query at least a first word represented by a first sign language gesture.

14. A method comprising:
    receiving images of a person making sign language gestures;
    identifying language elements from the sign language gestures;
    inputting the language elements as search information to a search engine;
    receiving results of a search for content from the search engine based on the language elements;
    switching the display device between a navigation mode, in which images of non-sign language gestures are used to provide navigation of at least one user interface (UI) on the display device and language elements from sign language gestures are not input as search information, and a text input mode, in which images of sign language gestures are used to input the language elements as search information.

15. The method of claim 14, comprising:
    receiving selection of an entry from the results; and
    responsive to the selection, presenting content on the display device.

16. The method of claim 14, wherein the display device comprises a television (TV).

* * * * *